United States Patent
Kaufmann et al.

(10) Patent No.: US 9,255,569 B2
(45) Date of Patent: Feb. 9, 2016

(54) SYSTEMS, METHODS, AND DEVICES FOR OPERATING A SOLAR THERMAL ELECTRICITY GENERATING SYSTEM

(75) Inventors: Gabriel Kaufmann, Beit Hananya (IL); Leon Afremov, Tel Aviv (IL); Yona Magen, Moshav Nehosha (IL)

(73) Assignee: BRIGHTSOURCE INDUSTRIES (ISRAEL) LTD., Jerusalem (IL)

( * ) Notice: Subject to any disclaimer, the term of this patent is extended or adjusted under 35 U.S.C. 154(b) by 220 days.

(21) Appl. No.: 13/695,145

(22) PCT Filed: May 3, 2011

(86) PCT No.: PCT/US2011/034900
§ 371 (c)(1),
(2), (4) Date: Dec. 5, 2012

(87) PCT Pub. No.: WO2011/140021
PCT Pub. Date: Nov. 10, 2011

(65) Prior Publication Data
US 2013/0091842 A1 Apr. 18, 2013

Related U.S. Application Data (60) Provisional application No. 61/330,500, filed on May 3, 2010.

(51) Int. Cl.
*F03G 6/06* (2006.01)
*F03G 6/00* (2006.01)
(Continued)

(52) U.S. Cl.
CPC .............. *F03G 6/003* (2013.01); *F01K 13/02* (2013.01); *F02C 1/05* (2013.01); *F03G 6/065* (2013.01); *F22B 1/006* (2013.01); *F22B 35/08* (2013.01); *F22B 35/14* (2013.01); *Y02E 10/46* (2013.01)

(58) Field of Classification Search
CPC ........... F03G 6/00; F03G 6/003; F03G 6/005; F03G 6/06; F03G 6/065; F03G 6/067; F22G 1/005; F22G 1/06; F22G 1/16; Y02E 10/46
USPC ................ 126/640, 646, 572–575, 601–602, 126/584–588, 594–598, 609–616; 60/641.8–641.15, 646, 676; 700/286–288, 291
See application file for complete search history.

(56) References Cited

U.S. PATENT DOCUMENTS 3,243,961 A * 4/1966 Caracristi ...................... 60/646
4,102,326 A 7/1978 Sommer
(Continued)

FOREIGN PATENT DOCUMENTS

WO 2008/154599 12/2008

OTHER PUBLICATIONS

International Search Report and Written Opinion for International Application No. PCT/US11/34900.
(Continued)

*Primary Examiner* — Thomas Denion
*Assistant Examiner* — Laert Dounis
(74) *Attorney, Agent, or Firm* — Miles & Stockbridge P.C.; Mark A. Catan (57) ABSTRACT

In a startup period for a solar thermal electricity generating system, a non-solar source of steam heats a downstream receiver (for example, a superheating receiver) prior to insolation being available. Insolation, once available, heats an upstream receiver (for example, an evaporator). The upstream receiver can be arranged in a recirculation loop with a steam separation drum, which may be bypassed during the initial heating of the upstream receiver by insolation. Once sufficient temperature and pressure have been reached, steam from the upstream receiver is directed to the downstream receiver by way of the steam separation drum to replace the non-solar source of steam. Heating of the downstream receiver using steam from the upstream receiver continues until a threshold temperature and pressure are reached. Insolation is then directed at both the upstream and downstream receivers to generate steam for electricity production by a turbine.

20 Claims, 9 Drawing Sheets (51) Int. Cl.
*F01K 13/02* (2006.01)
*F02C 1/05* (2006.01)
*F22B 1/00* (2006.01)
*F22B 35/08* (2006.01)
*F22B 35/14* (2006.01)

(56) References Cited

U.S. PATENT DOCUMENTS

| | | | |
|---|---|---|---|
| 4,117,682 A | 10/1978 | Smith | |
| 4,146,785 A | 3/1979 | Neale | |
| 4,172,443 A | 10/1979 | Sommer | |
| 4,245,618 A | 1/1981 | Wiener | |
| 4,257,397 A | 3/1981 | Gouyou-Beauchamps | |
| 4,265,223 A | 5/1981 | Miserlis et al. | |
| 4,265,233 A | 5/1981 | Sugitachi et al. | |
| 4,289,114 A | 9/1981 | Zadiraka | |
| 4,320,663 A | 3/1982 | Francia | |
| 4,438,630 A | 3/1984 | Rowe | |
| 4,825,654 A | 5/1989 | Svoboda | |
| 4,887,431 A | 12/1989 | Peet | |
| 5,396,865 A * | 3/1995 | Freeh | F22B 34/14 122/406.4 |
| 5,417,052 A | 5/1995 | Bharathan et al. | |
| 5,899,199 A | 5/1999 | Mills | |
| 6,131,565 A | 10/2000 | Mills | |
| 6,957,536 B2 | 10/2005 | Litwin et al. | |
| 7,055,519 B2 | 6/2006 | Litwin | |
| 7,191,597 B2 | 3/2007 | Goldman | |
| 7,191,736 B2 | 3/2007 | Goldman | |
| 7,331,178 B2 | 2/2008 | Goldman | |
| 7,987,844 B2 | 8/2011 | Zillmer | |
| 8,001,960 B2 | 8/2011 | Gilon et al. | |
| 8,033,110 B2 | 10/2011 | Gilon et al. | |
| 8,327,840 B2 | 12/2012 | Gilon et al. | |
| 8,544,272 B2 | 10/2013 | Kroizer et al. | |
| 8,573,196 B2 | 11/2013 | Plotkin et al. | |
| 8,627,664 B2 | 1/2014 | Katz et al. | |
| 8,655,498 B2 | 2/2014 | Bronicki | |
| 8,739,775 B2 | 6/2014 | Kroyzer et al. | |
| 8,763,397 B1 * | 7/2014 | Meduri | F03G 6/00 126/572 |
| 2005/0150230 A1 | 7/2005 | Rollins, III | |
| 2007/0084208 A1 | 4/2007 | Goldman | |
| 2007/0157614 A1 | 7/2007 | Goldman | |
| 2007/0157922 A1 | 7/2007 | Radhakrishnan et al. | |
| 2007/0221208 A1 | 9/2007 | Goldman | |
| 2008/0000436 A1 | 1/2008 | Goldman | |
| 2008/0011290 A1 | 1/2008 | Goldman et al. | |
| 2008/0293132 A1 | 11/2008 | Goldman et al. | |
| 2008/0314438 A1 | 12/2008 | Tran et al. | |
| 2009/0038608 A1 | 2/2009 | Caldwell | |
| 2009/0125152 A1 * | 5/2009 | Skowronski et al. | 700/281 |
| 2009/0217921 A1 | 9/2009 | Gilon et al. | |
| 2009/0229264 A1 | 9/2009 | Gilon et al. | |
| 2009/0250052 A1 | 10/2009 | Gilon et al. | |
| 2009/0260359 A1 * | 10/2009 | Palkes | 60/641.8 |
| 2010/0006087 A1 | 1/2010 | Gilon et al. | |
| 2010/0191378 A1 | 7/2010 | Gilon et al. | |
| 2010/0236239 A1 | 9/2010 | Kroizer et al. | |
| 2010/0300510 A1 | 12/2010 | Goldman et al. | |
| 2011/0088396 A1 * | 4/2011 | Katz et al. | 60/641.8 |
| 2011/0220091 A1 | 9/2011 | Kroyzer | |
| 2012/0024282 A1 | 2/2012 | Gilon et al. | |
| 2013/0192589 A1 | 8/2013 | Silberstein et al. | |
| 2014/0152024 A1 | 6/2014 | Kroizer | |

OTHER PUBLICATIONS

Office Action issued Sep. 29, 2014, in Chinese Patent Application No. 201180022476.X.

Office Action issued May 15, 2015, in Chinese Patent Application No. 201180022476.X.

* cited by examiner

SYSTEMS, METHODS, AND DEVICES FOR OPERATING A SOLAR THERMAL ELECTRICITY GENERATING SYSTEM

CROSS-REFERENCE TO RELATED APPLICATIONS

The present application is a U.S. national stage entry of International Application No. PCT/US11/34900, filed May 3, 2011, which claims the benefit of U.S. Provisional Application No. 61/330,500, filed May 3, 2010, both of which are hereby incorporated by reference herein in their entireties.

FIELD

The present disclosure relates to the conversion of solar radiation to usable forms of energy, such as heat and/or electricity, and, more particularly, to systems, methods, and devices for effecting start-up of a solar steam system.

SUMMARY

During periods of low solar insolation, such as at night or during periods of extended cloud cover, one or more of the solar receivers of a solar thermal electricity generating system may cool down from an operating state, i.e., an operating temperature and pressure, to a sub-optimal state, i.e., ambient temperature and/or pressure. When adequate insolation is available, the system returns to the operating state in order to produce electricity. A startup period may be necessary for the system to transition from a sub-optimal state, where little or no electricity may be generated, to the operating state.

During a startup period for the solar thermal electricity generating system, a non-solar source of steam can be used to heat one or more downstream receivers, such as a superheating receiver and/or a reheating receiver, prior to insolation being available. Once insolation is available, it can be used to heat one or more upstream receivers, such as an evaporator. Once sufficient temperature and pressure have been reached, the steam from the upstream receiver can replace the non-solar source of steam to continue heating the one or more downstream receivers until a threshold temperature and pressure are reached. Insolation can then be directed at both the upstream and downstream receivers to generate steam, for example, superheated steam, for electricity production using a turbine.

In embodiments, a method for operating a solar thermal electricity generating system can include, during a first time period, heating at least a portion of a first receiver using steam from an auxiliary steam source. During a second time period, at least a portion of a second receiver can be heated using solar insolation incident thereon. The method can further include, after the first time period, continuing to heat the at least a portion of the second receiver using solar insolation incident thereon while directing steam from an outlet of the second receiver to an inlet of the first receiver.

In embodiments, a method for operating a solar thermal electricity generating system can include preheating a first solar receiver using steam from an auxiliary non-solar steam source and preheating a second solar receiver using solar insolation incident thereon. Once the first and second solar receivers achieve respective first preheated states, steam from the second solar receiver can be directed to the first solar receiver while continuing to heat the second solar receiver using solar insolation incident thereon.

In embodiments, a solar thermal electricity generating system can include an evaporating solar receiver, a superheating solar receiver, a steam separation drum, a bypass line, and an auxiliary steam supply. The evaporating solar receiver can be constructed to generate steam using solar radiation incident thereon, while the superheating solar receiver can be constructed to superheat the generated steam using solar radiation incident thereon. The steam separation drum can be constructed to separate the generated steam from liquid water. A steam outlet of the steam separation drum can be alternatively connected to an inlet line of the superheating solar receiver. An inlet of the steam separation drum can be connected to an outlet line of the evaporating solar receiver. A water outlet of the steam separation drum can be connected to a recirculating flow path connected to an inlet line of the evaporating solar receiver. The bypass line can alternatively connect the outlet line of the evaporating solar receiver to the recirculating flow path so as to bypass the steam separation drum. The auxiliary steam supply can produce steam for preheating the superheating solar receiver from a non-solar source. The inlet line of the superheating solar receiver can be alternatively connected to the auxiliary steam supply.

In embodiments, a solar thermal electricity generating system can include a first solar receiver, a second solar receiver, a plurality of heliostats, and a preheater. The first solar receiver can be constructed to heat a fluid therein using solar radiation incident thereon. The second solar receiver can be constructed to heat a fluid therein using solar radiation incident thereon. The heliostats can reflect solar insolation onto the first and second solar receivers. The preheater can heat the first solar receiver prior to receiving the reflected solar insolation on the first solar receiver.

In embodiments, a method of operating a solar thermal electricity generating system can include circulating fluids heated by an auxiliary boiler through an auxiliary fluid circuit that includes one or more superheating receiver panels so as to elevate temperatures therein. The method can further include circulating fluids through one or more steam generating receiver panels that are exposed to solar radiation so as to elevate temperatures therein, and supplying steam from the one or more steam generating receiver panels to heat a steam separation drum and the one or more superheating receiver panels to an operational temperature for producing solar power. Supplying the steam can include connecting the steam separation drum to the one or more steam generating receiver panels, connecting the drum to the one or more superheating panels by opening a drum isolation valve connected between the drum and the one or more superheating panels, and disconnecting the auxiliary boiler from the one or more superheating panels by closing an auxiliary boiler bypass valve connected between the one or more superheating panels and the auxiliary boiler.

In embodiments, a method of operating a solar thermal system to generate electricity can include using a programmable control system, which is configured to generate scheduling signals used by the solar thermal system to control operating configurations during a diurnal operation of the solar thermal system, to generate a first startup signal commanding a first startup period operation of the solar thermal system. The first startup signal may coincide with a first level of insolation. Responsively to the first startup signal, the solar thermal system can be controlled to use a non-solar source of steam to heat a first solar receiver portion, the first solar receiver portion being connected to receive a heat transfer fluid from a second solar receiver portion upstream. The programmable control system can be used to generate a second startup signal commanding a second startup period of operation of the solar thermal system. The second startup signal may coincide with a second level of insolation that is greater than the first level of insolation. Responsively to the second startup signal, the second receiver portion can be heated with insolation. The second receiver portion can have a recirculation loop with a fluid separation drum configured to be bypassed responsively to the second startup signal. The programmable control system can be used to detect a first threshold temperature and pressure in the second receiver portion and to generate a third startup signal commanding a third startup period of operation of the solar thermal system responsively to the detected first threshold temperature and pressure. Responsively to the third startup signal, the second receiver portion can be heated with insolation while directing fluid from the second receiver portion to the first receiver portion by way of the fluid separation drum. The programmable control system can be used to detect a second threshold temperature and pressure in the first receiver portion and to generate a fourth startup signal commanding a fourth startup period of operation of the solar thermal system responsively to the detected second threshold temperature and pressure. Responsively to the fourth startup signal, the first receiver portion can be heated with insolation while continuing to heat the second receive portion with insolation and to direct fluid from the second receiver portion to the first receiver portion by way of the fluid separation drum.

Objects and advantages of embodiments of the present disclosure will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features may not be illustrated to assist in the illustration and description of underlying features. Throughout the figures, like reference numerals denote like elements.

DETAILED DESCRIPTION

Figure 1:
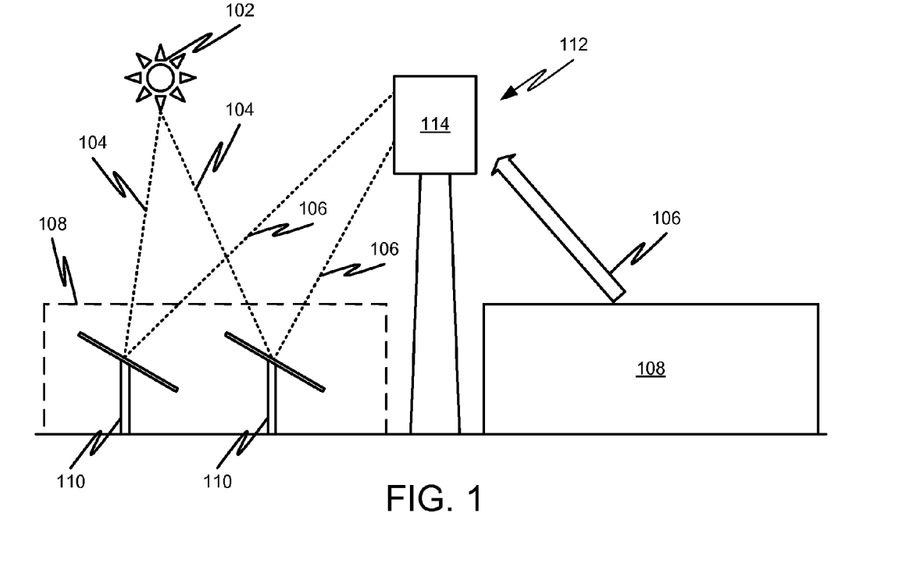
FIG. 1 is an elevation view of a solar thermal electricity generating system with an elevated receiver in a tower, according to one or more embodiments of the disclosed subject matter.

Incident solar radiation can be used by a solar thermal electricity generating system, such as a solar tower system, to generate steam and/or to heat molten salt, which can then be used to generate electricity, such as via a steam turbine. Referring to FIG. 1, a solar tower system can include a solar tower 112 that receives reflected focused sunlight 106 from a solar field 108 of heliostats 110. In FIG. 1, only two heliostats 110 are shown for illustrative purposes, but in practice a large number of heliostats may be disposed within field 108. For example, solar field 108 may include thousands or tens of thousands of heliostats 110 associated with each solar tower 112. Mounted in or on the tower is a solar energy receiver system 114, which can include one or more individual solar receivers. The solar receivers can be constructed to heat water and/or steam and/or supercritical steam and/or another type of heat transfer fluid using insolation received from the heliostats 110. For example, the solar tower 112 can have a height from 25 m to 75 m, or higher.

The heliostats 110 can be aimed at solar energy receiver system 114, for example, a solar energy receiving surface of one or more receivers of system 114. Lines 106 represent optical paths for beams of sunlight reflected by heliostats 110 onto the solar energy receiver system 114. Heliostats 110 can adjust their orientation to track the sun as it moves across the sky, thereby maintaining reflected solar insolation on one or more aiming points associated with the solar energy receiver system 114.

Figure 2:
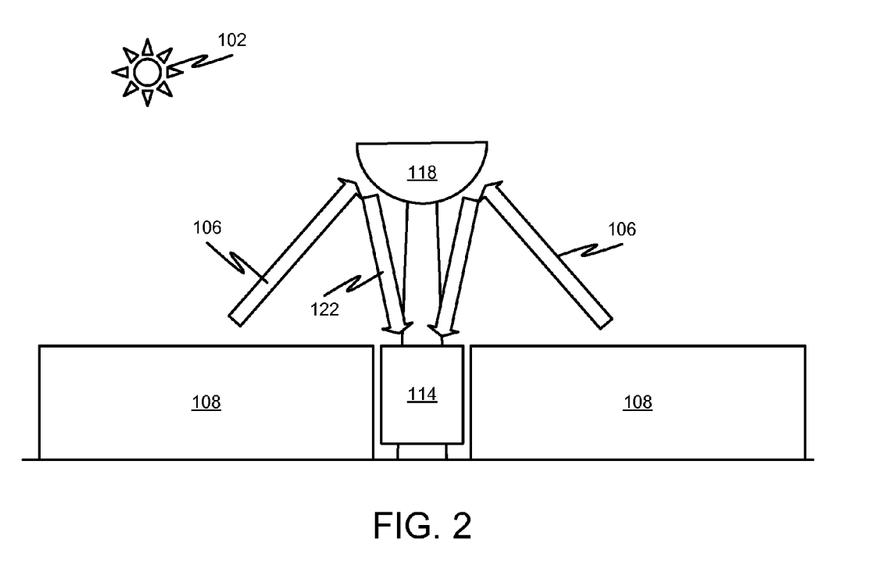
FIG. 2 is an elevation view of another solar thermal electricity generating system with an elevated reflector in a tower, according to one or more embodiments of the disclosed subject matter.
Figure 5:
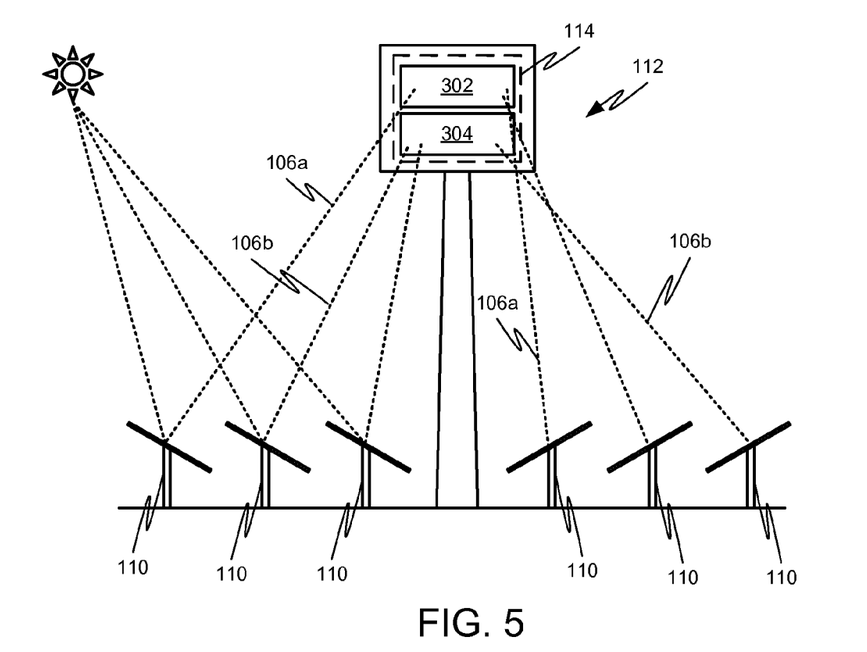
FIG. 5 is an elevation view showing an arrangement of first and second solar receivers at different elevations in a tower, according to one or more embodiments of the disclosed subject matter.

The solar energy receiver system 114 can be arranged at or near the top of tower, as shown in FIGS. 1 and 5. Alternatively, a secondary reflector 118 can be arranged at or near the top of a tower 120, as shown in FIG. 2. The secondary reflector 118 can thus receive the reflected insolation 106 from the field 108 of heliostats and redirect the insolation (e.g., as reflected rays 122) toward a solar energy receiver system 114. The solar energy receiver system 114 can be arranged within the field of heliostats 108, outside of the field of heliostats 108, at or near ground level, at or near the top of another tower (not shown), above or below reflector 118 (not shown), or elsewhere.

More than one solar tower can be provided, each with a respective solar energy receiving system thereon, for example, a solar power steam system. The different solar energy receiving systems may have different functionalities. For example, one of the solar energy receiving systems may heat water using the reflected solar radiation to generate steam while another of the solar energy receiving systems may superheat steam using the reflected solar radiation. The multiple solar towers may share a common heliostat field or have separate respective heliostat fields. Some of the heliostats may be constructed and arranged so as to alternatively direct insolation at solar energy receiving systems in different towers. In addition, the heliostats may be configured to direct insolation away from any of the towers, for example, during a dumping condition. Any of the multi-tower configurations disclosed in U.S. Patent Application Publication No. 2010-0191378, entitled "Distributed Power Towers with Differentiated Functionalities," can be employed in the present system.

As mentioned above, more than one solar receiver can be provided on a solar tower. The multiple solar receivers in combination may form a part of the solar energy receiving system 114. The different solar receivers may have different functionalities. For example, one of the solar receivers may heat water using the reflected solar radiation to generate steam while another of the solar receivers may serve to superheat steam using the reflected solar radiation. The multiple solar receivers can be placed next to each other (i.e., at the same elevation within a tower), one on top of the other (i.e., at different elevations within a tower), on different faces of a tower (i.e., one facing a particular direction), on different towers, or within separate portions of a single receiver unit. Some of the heliostats in field 108 may be constructed and arranged so as to alternatively direct insolation at the different solar energy receiving systems.

For example, in FIG. 5, two solar receivers 302, 304 are provided in a single tower 112. The solar energy receiving system 114 thus includes a first solar receiver 304 (e.g., a downstream solar receiver) and a second solar receiver 302 (e.g., an upstream solar receiver). At any given time, a heliostat 110 may be aimed at one or both of the solar receivers, or at none of the receivers. In some use scenarios, the aim of a heliostat 110 may be adjusted so as to move a centroid of the reflected beam projected at the tower 112 from one of the solar receivers (e.g., 302) to the other of the solar receivers (e.g., 304). Although only two solar receivers and a single tower are shown in FIG. 5, any number of solar towers and solar receivers can be used. In addition, although the second solar receiver 302 is shown arranged above the first solar receiver 304, this arrangement is only exemplary. It is also contemplated that the first solar receiver 304 may be arranged above the second solar receiver 302.

Figure 6:
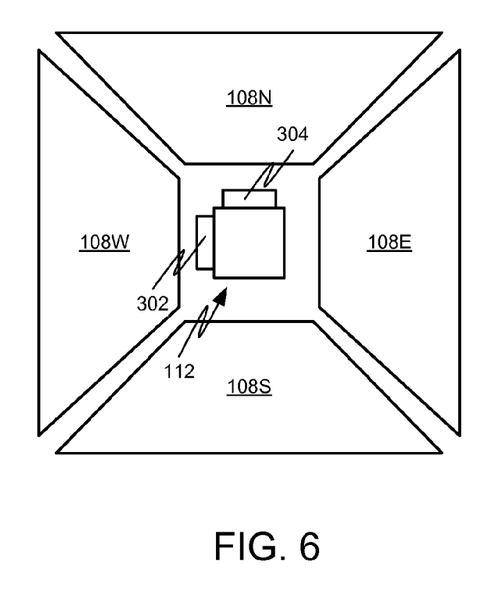
FIG. 6 is a plan view showing an arrangement of first and second solar receivers at different locations in a tower, according to one or more embodiments of the disclosed subject matter.

In another example, as shown in FIG. 6, the first solar receiver 304 can be mounted on a northern face of tower 112 so as to receive insolation from heliostats in a northern section 108N of the field while the second solar receiver 302 can be mounted on a western face of tower 112 so as to receive insolation from heliostats in a western section 108W of the field. Other arrangements are also possible according to one or more contemplated embodiments.

Figure 3A:
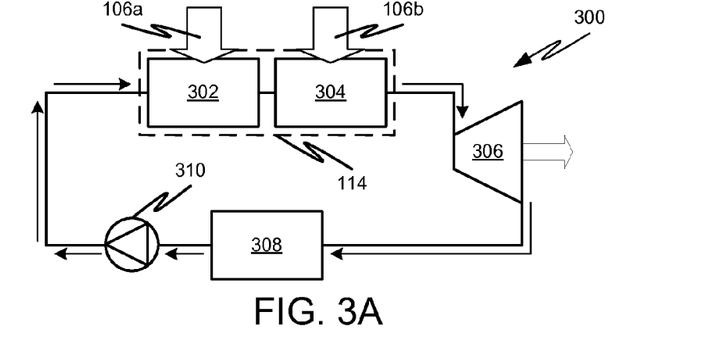
FIG. 3A is a schematic diagram of an arrangement of first and second solar receivers with a turbine, according to one or more embodiments of the disclosed subject matter.

FIG. 3A shows a simplified arrangement of a solar thermal electricity generating system 300 during electricity generation by a turbine 306. Such a configuration may apply during normal operation of the solar thermal electricity generating system 300, for example, during late morning and afternoon time periods when solar insolation may be relatively plentiful.

The solar thermal electricity generating system 300 can include a pair of solar receivers or solar receiving portions. In particular, a second solar receiver 302 (i.e., an upstream solar receiver) can be in fluid communication with a first solar receiver 304 (i.e., a downstream solar receiver), at least during the electricity generation. As discussed above, the first and second solar receivers may be part of the same solar energy receiving system 114, for example, mounted in the same tower or in different towers. Insolation 106a, 106b incident on the solar receivers 302, 304 heats the fluid flowing therethrough. The first solar receiver 304 may be rated to a higher temperature and/or pressure than the second solar receiver 302. For example, the first solar receiver 304 may be rated to handle fluid between 50° C. and 200° C. higher than the second solar receiver 302.

In a solar steam system, the second solar receiver 302 may be an evaporator, which uses solar insolation 106a to heat water flowing through the second solar receiver 302 into saturated steam, for example at a temperature of about 250° C. and a pressure of about 40 bar at the second solar receiver outlet. Water may be pumped from a condenser 308 or other feedwater source to the second solar receiver 302 by one or more pumps 310 and associated flow control mechanisms. The saturated steam can be provided to the first solar receiver 304, which may be a superheater. The first solar receiver 304 can use solar insolation 106b to superheat the saturated steam flowing through the first solar receiver 304 into superheated steam, for example at a temperature of about 450-600° C. and a pressure of about 40 bar at the first solar receiver outlet. The superheated steam can be provided to turbine 306 for use in producing electricity. The output line of the turbine 306 may be directed back to condenser 308 to produce water for use by the second solar receiver 302.

Figure 3B:
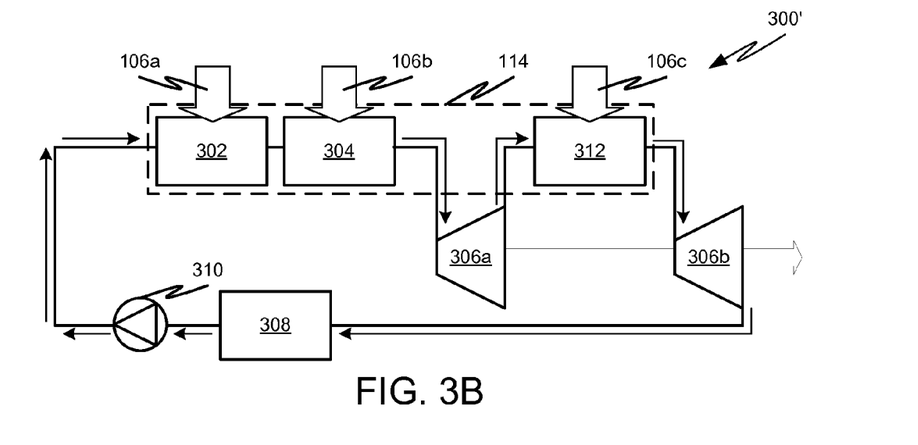
FIG. 3B is a schematic diagram of an arrangement of first and second solar receivers with a turbine with a reheat cycle, according to one or more embodiments of the disclosed subject matter.

Alternatively, the turbine may include a reheat cycle 306b, as shown in system 300' of FIG. 3B. The superheated steam output of the superheater 304 is thus directed to a first cycle 306a of the turbine. An outlet of the turbine 306a may be directed to a reheating solar receiver 312 (e.g., a further downstream receiver). The reheater 312 may also be part of the same solar energy receiving system 114 as the first and second solar receivers, or part of a separate solar energy receiving system. Reheater 312 uses solar insolation 106c to reheat the steam for input to the reheater cycle 306b of the turbine. The output line of the turbine 306b may be directed back to the condenser 308 to produce water for use by the second solar receiver 302.

It should be apparent that not all of the elements of a solar thermal electricity generating system have been illustrated in the figures. Rather, the figures have been simplified and elements omitted for clarity in discussing the various features of the disclosed subject matter. It will be appreciated that additional elements can be added in a practical implementation of the system. For example, although the second solar receiver 302 is shown as directly connected to the first solar receiver 304 in FIGS. 3A-3B, it should be appreciated that additional components may be provided in the flow path between them, such as, but not limited to, one or more valves, switches, detectors, flow control devices, and/or fluid processing components. In addition, although the first and second solar receivers have been identified as an evaporator and a superheater, respectively, the functions of the receivers are not limited to these. Rather, other functionalities are also possible according to one or more contemplated embodiments. For example, the first solar receiver 304 can be used to heat supercritical steam. In another example, the first solar receiver 304 can be a reheater, such as reheater 312.

Figure 4:
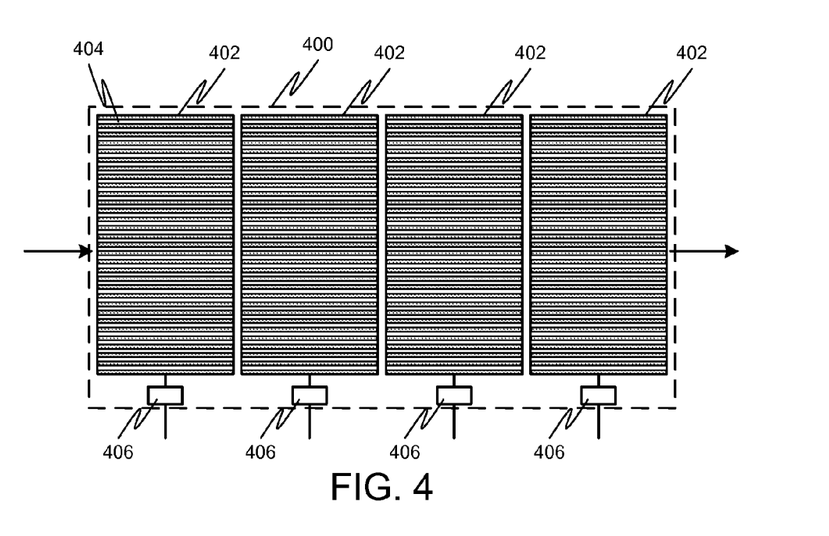
FIG. 4 is a schematic diagram of tubes and panels for a solar receiver, according to one or more embodiments of the disclosed subject matter.

FIG. 4 illustrates an exemplary structure of a receiver 400, for example, one of receivers 302, 304, or 312. The solar receiver 400 can include one or more solar panels 402, serially arranged, such that fluid flows through each panel 402 of the receiver 400 in turn, from left to right in the figure. The panels 402 may have respective drains 406 for removing steam and/or water therefrom. Each panel 402 can include a plurality of parallel tubes 404 embedded therein. Solar insolation incident on the panels 402 heats the fluid flowing through the tubes 404 such that a temperature of the fluid increases from the tube inlet to the tube outlet. Each tube may also include a separate drain or connection to common drain 406 of the respective panel 402 for removing steam and/or water therefrom. Each panel 402 may have between 10 and 200 tubes, each having a diameter of between 2 cm and 10 cm. The panels 402, and thus the receiver 400, may be rated for a certain temperature and/or pressure, for example, based on materials used for the panel 402 and/or tubes 404, the thickness of the tubes 404, the amount of mobility allowed for each tube 404 (for example, in a direction perpendicular to the longitudinal axis of the tube), and/or any other physical parameter that would contribute to a temperature/pressure rating of the solar receiver 400.

In one or more embodiments, in order for the electricity to be generated by turbine 306, one or more of the following conditions may prevail in the solar thermal electricity generating system: (1) there is a sufficient steam supply for the first solar receiver 304 at a required temperature and pressure for the first solar receiver 304; (2) there is steam in a steam separation drum (e.g., drum 802) of sufficient quantity and temperature/pressure to feed to the first solar receiver 304; (3) the temperature within the first solar receiver 304 and/or an output line of the first solar receiver 304 is at least between 300°-600° C.

The fluid conduits (e.g., tubes 404) within the second solar receiver 302 and/or fluid conduits (e.g., tubes 404) within the first solar receiver 304 may be substantially uninsulated. During periods of low or no solar insolation (e.g., at night or during extended cloud cover), the first and second solar receivers may cool, thereby resulting in a reduced temperature and pressure of the fluid within the respective receivers below a typical operating temperature and pressure. For example, the fluid in the superheating receiver may have cooled to ambient temperature and vacuum pressure while the fluid in the evaporating receiver may have cooled to ambient temperature and a pressure of equivalent to that of a steam separation drum. To counteract the effect of the cooling, fluids and/or materials of the receivers can be heated during a startup period prior to resuming electricity production. The method may be repeated daily, for example, each morning to address cooling during a night-time period.

The disclosed startup techniques include heating one or more solar receivers of the system in preparation for generating steam, for example, to drive a steam turbine to generate electricity. Generally, the first solar receiver 304, e.g., a superheating receiver, can be gradually heated during a startup period, which may begin prior to solar insolation being available. The first solar receiver 304 may thus be heated from a cooled temperature, for example, ambient temperature, to a threshold temperature, which is a steam saturation temperature. For example, the threshold temperature may be in the range of 150° C. to 600° C. The rate of heating may be substantially steady, for example, at a rate between 2° C./min and 15° C./min over a time period of 5-20 minutes.

Figure 7A:
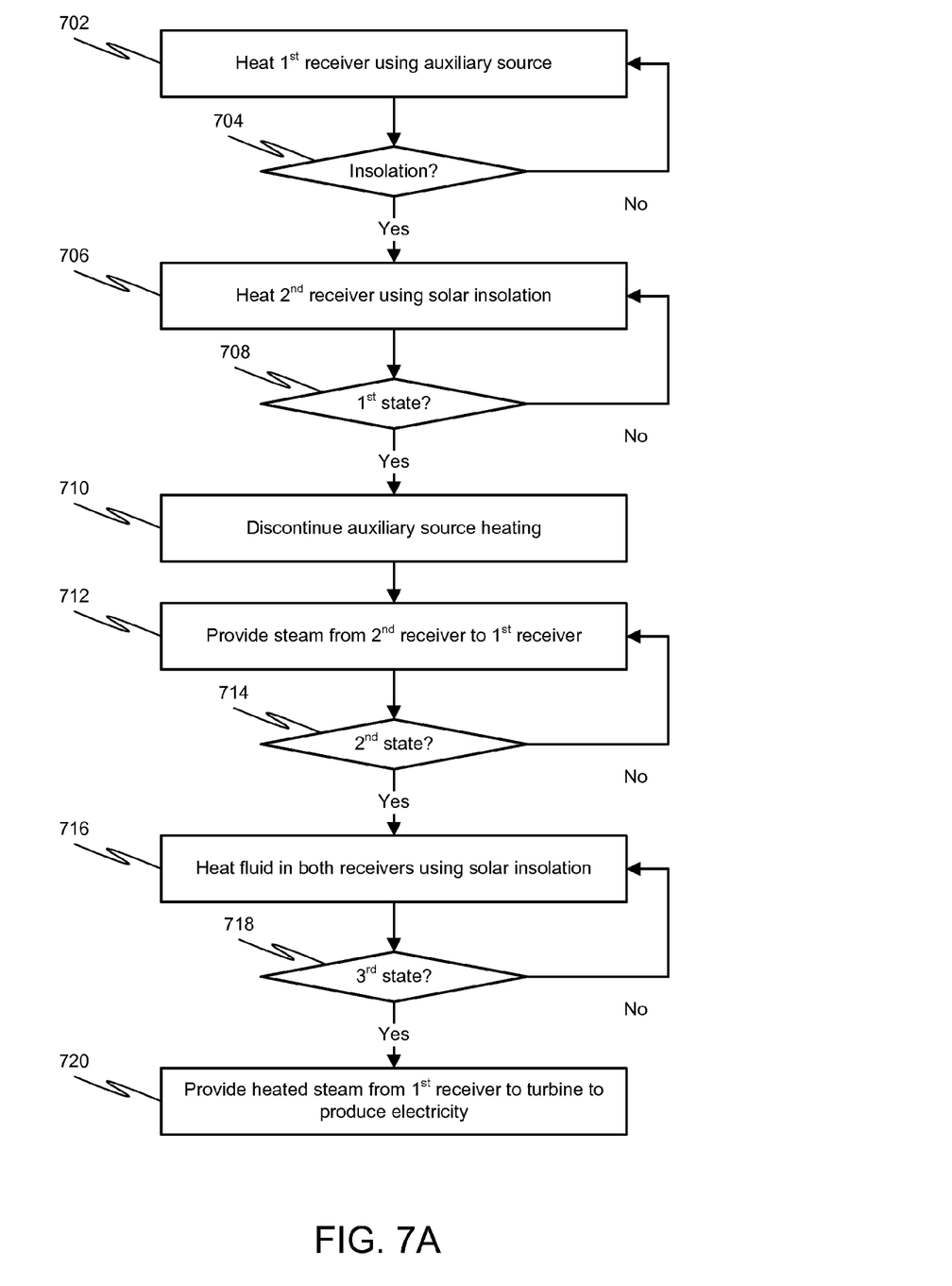
FIG. 7A is a process flow diagram of a method for controlling a solar thermal electricity generating system, according to one or more embodiments of the disclosed subject matter.

Referring to FIGS. 7A, at 702, a first time period of the startup includes heating the first solar receiver 304 using an auxiliary source. The auxiliary source may provide, for example, saturated steam that heats the first solar receiver 304 by flowing therethrough. The heating of the first solar receiver 304 may begin before any solar insolation is available, for example, at a time period before sunrise. The heating may begin anywhere from several hours before sunrise to within a few minutes before sunrise, depending on one or more operating parameters and system conditions. For example, the heating of the second solar receiver 304 may begin 15 minutes before sunrise.

The auxiliary source may use a non-solar source of energy to produce the steam and/or heat the first solar receiver directly. For example, the auxiliary source can use one of a fossil-fuel powered heating process, a nuclear-reaction powered heating process, an electrical heating process, a biogas-based heating process, a biomass-based heating process, a geothermal-based heating process, a chemical heating process, stored thermal energy, and waste heat from a separate process, such as a combustion turbine, in order to generate steam for heating the first solar receiver 304.

At 704, it is determined if insolation is available and/or if a sufficient time period has passed for heating of the first solar receiver 304 using the auxiliary steam. If no, the first solar receiver 304 continues to be heated by the auxiliary steam. If yes, the process proceeds to 706. At 706, at a later time with respect to 702 (for example, between 1 minute and 20 minutes after 702), solar insolation may be employed to heat fluid in the second solar receiver 302. The second solar receiver 302 may be constructed so as to use the insolation to boil water therein at any pressure (for example, 1 bar or greater).

Figure 7B:
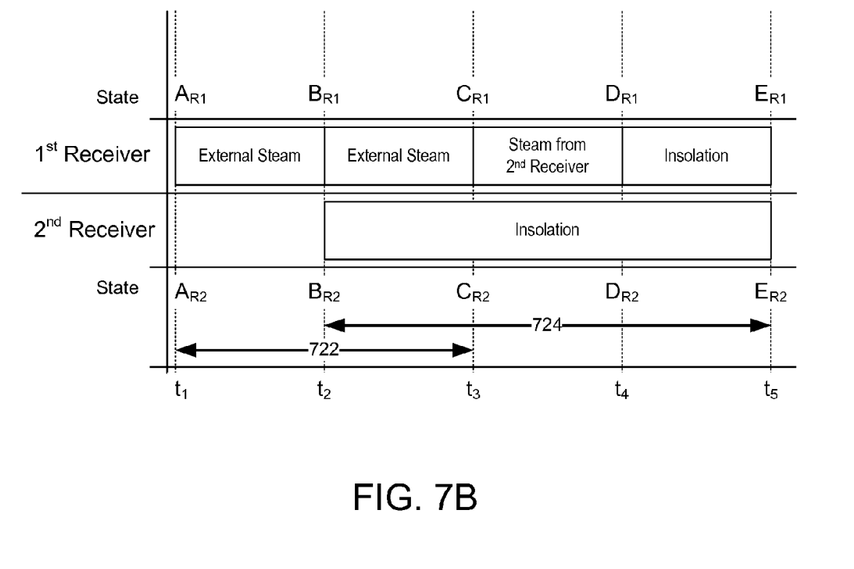
FIG. 7B is a time map showing the receiver states and heating sources for the first and second receivers during startup, according to one or more embodiments of the disclosed subject matter.

Even though 702 commences before 706, for at least some of the startup period, the heating of the first solar receiver 304 by the auxiliary source continues simultaneously with the heating of the second solar receiver 302 by insolation, as illustrated in the time map of FIG. 7B. Thus, a first time period (i.e., first period 722 in FIGS. 7B-7C) during which the first solar receiver 304 is heated by the auxiliary steam source begins before and overlaps with a second time period (i.e., second period 724 in FIGS. 7B-7C) during which the second solar receiver 302 is heated by insolation.

At 708, it is determined if the first and second solar receivers have achieved a particular first state, i.e., a first temperature and pressure. This first state can be a state when the fluid at the outlet of the second solar receiver 302 and the fluid at the inlet of the first solar receiver 304 are at substantially the same temperature and pressure. This same temperature and pressure can be a steam saturation temperature at the particular pressure. For example, as illustrated in Table 1 below, the temperature and pressure of the first state can be 150° C. and 5 bar. Alternatively, the first state can be a state when the fluid at the outlet of the second solar receiver 304 and the fluid at the outlet of the steam separation drum 802 are at substantially the same temperature and pressure. The temperature at the outlet of the second solar receiver 302 and the inlet of the first solar receiver 304 may thus be within a certain allowable range, for example, 50° C., but not necessarily identical.

If at 708 it is determined that the first state has not been reached, the heating of the second receiver 302 using solar insolation and the first receiver 304 using an auxiliary source continues. Otherwise, the process proceeds to 710, where the heating of the first receiver using the auxiliary source is discontinued. Proceeding to 712, the steam from the second solar receiver 302 is thereafter provided to first solar receiver 304 while insolation continues to be directed onto the second solar receiver 302. For example, once the first state is achieved, the steam from the second solar receiver 302 may be conveyed to the first solar receiver 304, via a pipe or, in the system of FIGS. 8-13, by way of a steam separation drum 802. The first solar receiver 304 is thus further heated only by steam from the second solar receiver 302 during this time period. During this time period, the temperature and pressure of the first and second solar receivers may be at a steam saturation temperature and pressure below a normal operating temperature and pressure of the system.

At 714, it is determined if one of the first and second solar receivers have achieved a particular second state, i.e., a second temperature and pressure. This second state can be a state when the fluid at the outlet of the second solar receiver 302 has reached its normal operating temperature and pressure. This normal operating temperature and pressure can be a steam saturation temperature at an elevated pressure. For example, as illustrated in Table 1 below, the temperature and pressure of the second state can be 250° C. and 40 bar. The temperature within the first solar receiver 304 may be, but is not necessarily, substantially identical to the temperature and pressure at the outlet of the second solar receiver 302.

If at 714 it is determined that the second state has not been reached, the heating of the second receiver 302 using solar insolation and the first receiver 304 using steam from the second receiver 302 continues. Otherwise, the process proceeds to 716, where solar insolation is used to heat fluid in both the first and second solar receivers. In particular, solar insolation on the first solar receiver 304 is used to further heat the steam provided by the second solar receiver 302, for example, to superheat the steam. However, the temperature and/or pressure at this time period might still be insufficient to drive a turbine.

At 718, it is determined if the first and second solar receivers have achieved a particular third state, i.e., a third temperature and pressure. This third state can be a state when the fluid at the outlet of the first solar receiver 304 has reached a minimum operating temperature and pressure for use by the turbine 306. For example, as illustrated in Table 1 below, the temperature and pressure of the third state can be 350° C. and 40 bar. Regardless of the determination in 718, both the first and second receivers continue to receive solar insolation and to heat respective fluids flowing therethrough using the insolation. When the third state has been reached, the process proceeds to 720, where steam from the first solar receiver 304 is provided to the turbine and the system enters normal operating mode. For example, in 720, solar insolation on the second solar receiver 302 continues to produce steam while the solar insolation on the first solar receiver 304 continues to superheat the steam from the second solar receiver. The heated steam from the first solar receiver 304 is provided to the turbine for use in producing electricity.

TABLE 1

Example solar receiver temperatures and pressures during/after startup.

| Receiver State Labels | Time (mins. with respect to sunrise) | Temperature | Pressure |
|---|---|---|---|
| $A_{R1}$ | −15 | Ambient | <1 bar |
| $A_{R2}$ | −15 | Ambient | 5 bar |
| $B_{R1}$ | 0 | Steam Sat. Temp. | <1 bar |
| $B_{R2}$ | 0 | Ambient | 5 bar |
| $C_{R1}$ | 15 | 150° C. | 5 bar |
| $C_{R2}$ | 15 | 150° C. | 5 bar |
| $D_{R1}$ | 30 | 250° C. | 40 bar |
| $D_{R2}$ | 30 | 250° C. | 40 bar |
| $E_{R1}$ | 45 | 350° C. | 40 bar |
| $E_{R2}$ | 45 | 250° C. | 40 bar |
| $Full_{R1}$ | Late morning | 450-600° C. | 40 bar |
| $Full_{R2}$ | Late morning | 250° C. | 40 bar |

FIG. 7B is a time map showing the different periods of startup, the heating supplies for each receiver during the different periods, and the receiver states (i.e., temperature and pressure) during the different periods. Table 1 above shows values for the receiver states listed in FIG. 7B, as well as a normal operating mod (i.e., $Full_{R1}$ and $Full_{R2}$, wherein the subscript R1 refers to the first receiver and the subscript R2 refers to the second receiver). Note that these values are exemplary only, and variations in the temperature and pressure of the receivers during the different periods are possible depending on different operating conditions and system design.

Figure 8:
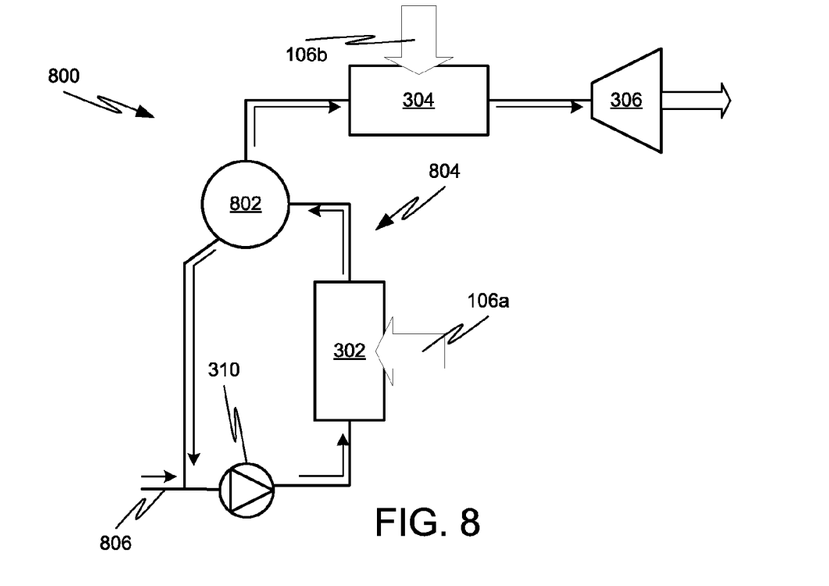
FIG. 8 is a schematic diagram showing the configuration of the first and second receivers and steam separation drum after startup, according to one or more embodiments of the disclosed subject matter.

Referring now to FIG. 8, a solar thermal electricity steam generating system 800 is shown during normal electricity generation mode. The second solar receiver 302, e.g., an evaporator, has a feedwater recirculation loop 804 associated with it. The evaporator 302 can use solar insolation 106a to generate steam from water pumped therethrough by a pump 310. Steam from an outlet of the evaporator 302 is conveyed by the recirculation loop 804 to a steam separation drum 802, where saturated steam is separated from water. Water is conveyed from a water outlet of the steam separation drum 802 by the recirculation loop 804 to an inlet of the evaporator 302 via pump 310. A feedwater supply 806 can also be provided to supplement the water supply to the inlet of the evaporator 302.

Figure 9:
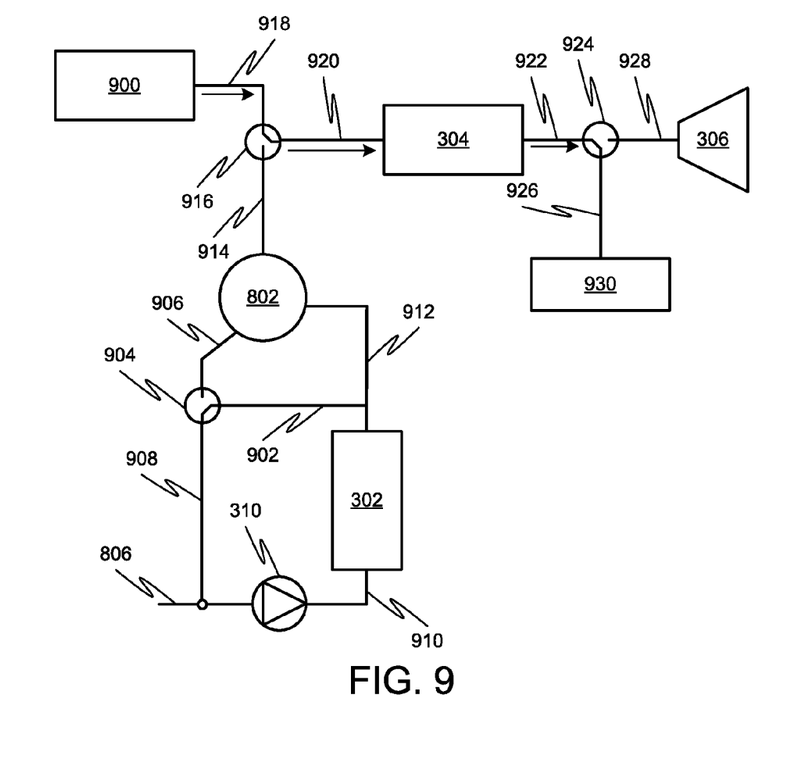
FIG. 9 is a schematic diagram showing the configuration of the first and second receivers and steam separation drum during a first stage of startup, according to one or more embodiments of the disclosed subject matter.
Figure 14:
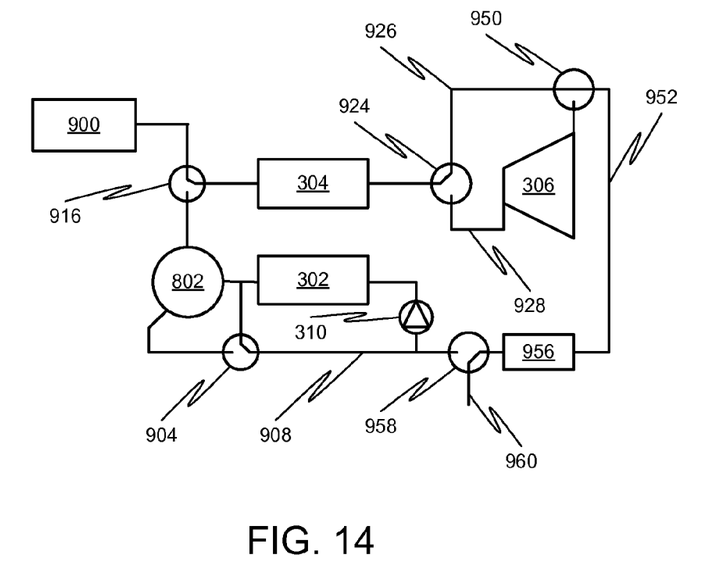
FIG. 14 is a schematic diagram showing a configuration of the first and second receivers in a system with a bypass line to a condenser during startup, according to one or more embodiments of the disclosed subject matter.
Figure 15:
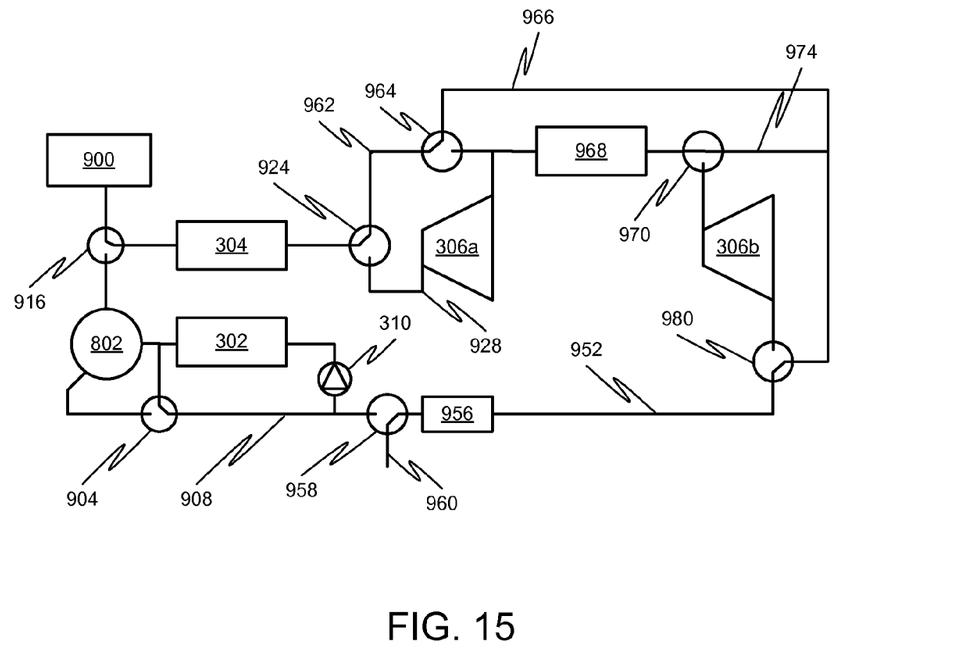
FIG. 15 is a schematic diagram showing a configuration of the first and second receivers in a system with a bypass line to a reheater during startup, according to one or more embodiments of the disclosed subject matter.

Saturated steam from the evaporator 302 is conveyed to an inlet of the first solar receiver 304, e.g., a superheating receiver, by way of a steam outlet of the steam separation drum 802. The superheating receiver 304 can use solar insolation 106b to superheat the steam, which can then be conveyed to the turbine 306 to generate electricity. At least some of the fluid that exits the turbine 306 can be sent to a reheater (for example, reheater 968, as shown in FIG. 15) and/or to another turbine (for example, reheat turbine cycle 978, as shown in FIG. 15). Alternatively or additionally, at least some of the fluid that exits the turbine 306 may reach the feedwater recirculation loop 804 via a condenser (for example, condenser 956, as shown in FIG. 14). Referring now to FIG. 9, a configuration of the solar thermal electricity steam generating system of FIG. 8 during a first startup period (i.e., during 702 of FIG. 7A) is shown. An auxiliary steam source 900 is connected to an input line 920 of the first solar receiver 304 through a steam line 918 and switch 916. The first solar receiver 304 is thus isolated from fluid from the second solar receiver 302 and the feedwater recirculating loop by switch 916. Fluid in the output line 922 of the first solar receiver 304, which may be insufficient to run turbine 306, may be directed away from an input line 928 of the turbine 306 by switch 924.

For example, switch 924 may direct fluid along a bypass line 926, which may be connected to another system component 930, such as a condenser, a reheat receiver, or a drain.

Figure 10:
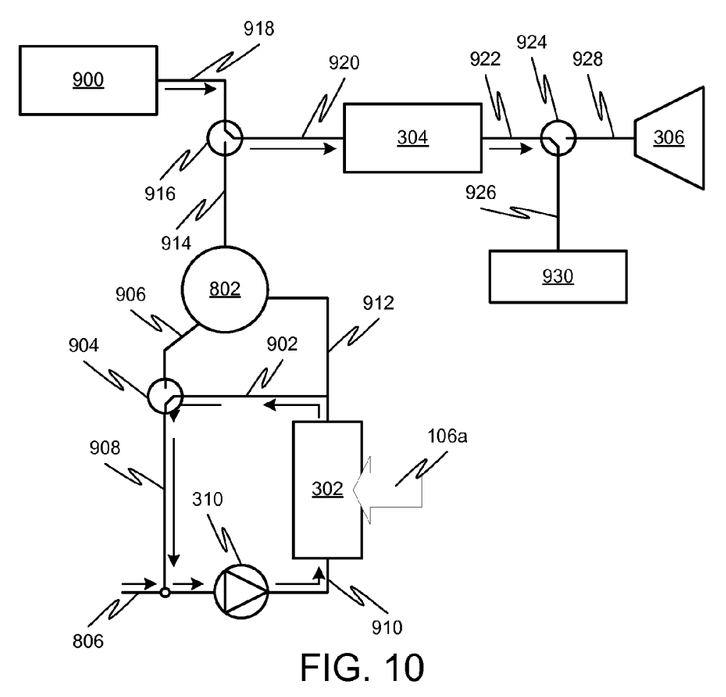
FIG. 10 is a schematic diagram showing the configuration of the first and second receivers and steam separation drum during a second stage of startup, according to one or more embodiments of the disclosed subject matter.

In FIG. 10, a configuration of the solar thermal electricity steam generating system of FIG. 8 during a second startup period (i.e., during 706 of FIG. 7A) is shown. Auxiliary steam source 900 remains connected to the input line 920 of the first solar receiver 304. The steam separation drum 802 is prevented from sending any fluid to the first solar receiver 304 due to switch 916. The feedwater recirculating loop associated with the second solar receiver 302 is modified by a bypass line 902 and switch 904. Fluid exiting the second solar receiver 302 thus flows along bypass line 902 rather than into the steam separation drum 802 via drum inlet line 912.

Initially, the temperature of the feedwater within the recirculating loop may be colder than normal operating temperature, for example, substantially at ambient temperature. The feedwater may be circulated along the bypassed portions (e.g., lines 902, 908, and 910) of the recirculating loop so as to be heated in the second solar receiver 302 by the insolation 106a as it passes through the receiver. After a certain amount of time or number of passes through the loop, the temperature and the pressure of the feedwater may increase.

The drum water outlet line 906 is also prevented from sending any fluid to the input line 908 of the feedwater recirculating loop by switch 904. Fluid from the outlet of the second solar receiver 302 is thus recirculated back to the input line 910 of the second solar receiver 302 without passing through the steam separation drum 802. Insolation 106a is directed on the second solar receiver 302, for example by heliostats in the solar field, to heat the second solar receiver and the fluid flowing therethrough. The steam separation drum 802 may be at least partially insulated, such that its temperature and pressure during periods of reduced insolation does not decrease substantially, or at least decreases at a substantially reduced rate as compared to the first and second receivers. The state at the steam outlet of the steam separation drum after a period of reduced insolation may be a steam saturation temperature at a reduced pressure from normal operating conditions, for example, a temperature of 150° C. at 5 bar. As noted above, the system may transition from heating of the first solar receiver 304 by auxiliary source 900 to heating of the first solar receiver 304 using steam from the second solar receiver 302 (i.e., a third startup period) when the temperature and pressure at an outlet of the second solar receiver 302 is substantially equal to that of the steam separation drum 802.

The steam from the second solar receiver 302 may directed to the steam separation drum 802 by closing the bypass line 902. This may occur before any steam is allowed to exit the steam separation drum 802 to the first solar receiver 304. During this time, the auxiliary source may continue to heat the first solar receiver 304. At some point, the quantity of steam in steam separation drum 802 and/or the total energy and/or enthalpy of steam within the steam separation drum 802 may increase such that steam may be provided to the first solar receiver 304. Accordingly, the steam from drum 802, e.g., saturated steam, can be sent via steam separation drum outlet line 914 to the inlet line 920 of the first solar receiver 304 by way of the switch 916, which has been selected to block the flowpath from the auxiliary source 900 thereby discontinuing heating of the first receiver 304 by the auxiliary source 900.

Figure 11:
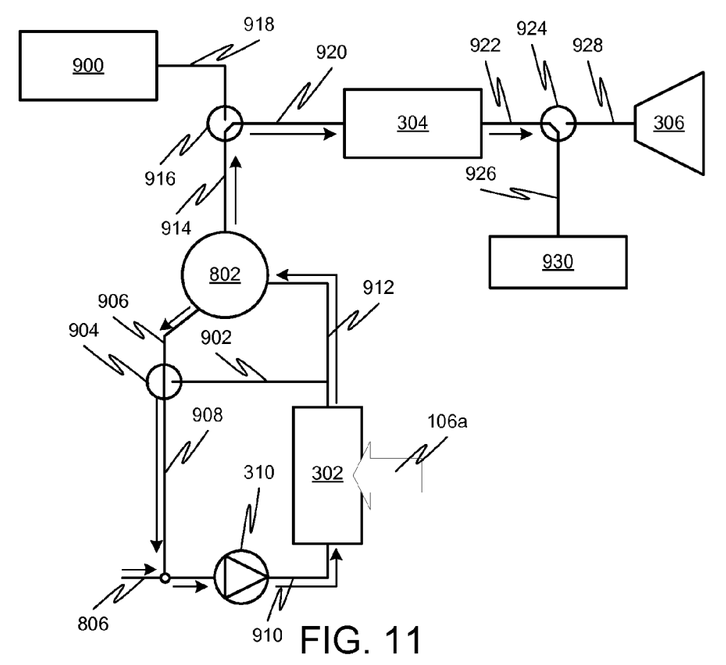
FIG. 11 is a schematic diagram showing the configuration of the first and second receivers and steam separation drum during a third stage of startup, according to one or more embodiments of the disclosed subject matter.

In FIG. 11, a configuration of the solar thermal electricity steam generating system of FIG. 8 during the third startup period (i.e., during 712 of FIG. 7A) is shown. The auxiliary steam source 900 is now disconnected from the input line 920 of the first solar receiver 304 by the switch 916. Switch 916 thus connects the steam output line 914 of the steam separation drum 802 to the input line 920. Bypass line 902 is also disconnected by switch 904, such that the recirculating loop again includes the steam separation drum 802. Insolation 106a incident on the second solar receiver 302 continues to heat the fluid therein to produce steam. The steam from the second solar receiver 302 is allowed to flow to the first solar receiver 304 by way of the steam separation drum 802. During this period, insolation may continue to be directed onto the second solar receiver 302 alone.

Figure 12:
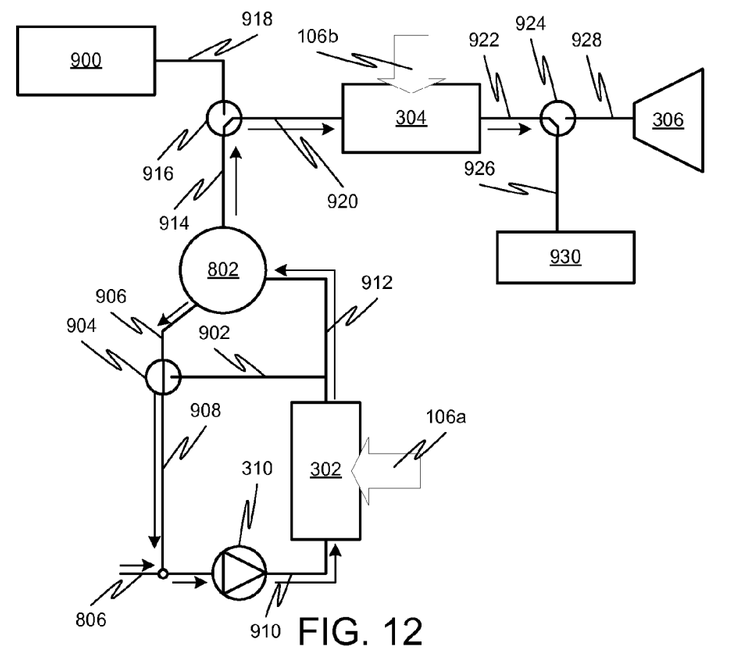
FIG. 12 is a schematic diagram showing the configuration of the first and second receivers and steam separation drum during a fourth stage of startup, according to one or more embodiments of the disclosed subject matter.

In FIG. 12, a configuration of the solar thermal electricity steam generating system of FIG. 8 during a fourth startup period (i.e., during 716 of FIG. 7A) is shown. In contrast to FIG. 11, insolation 106b is now directed onto the first solar receiver 304 in addition to the insolation 106a directed on the second solar receiver 304. The second solar receiver 304 may produce steam at a first temperature and pressure using insolation 106a, while the first solar receiver 302 further heats the steam from the second receiver 304 to a second temperature higher than the first temperature using insolation 106b. During this period, the heated steam in outlet line 922 of the first solar receiver 304 may be insufficient to run the turbine 306. Accordingly, the switch 924 remains in a configuration directing the steam in outlet line 922 away from the turbine 306.

Figure 13:
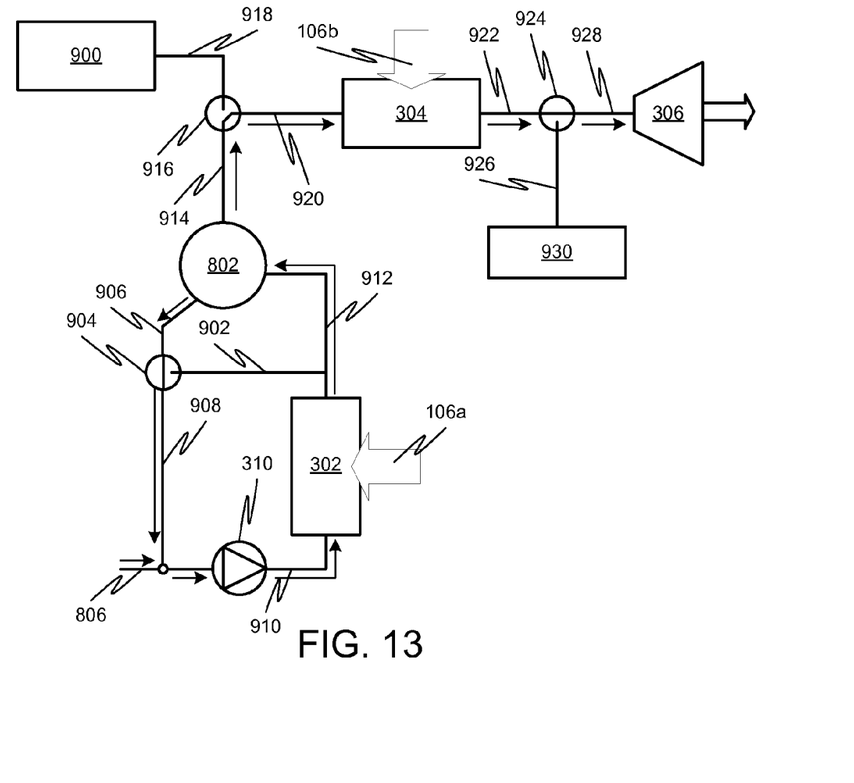
FIG. 13 is a schematic diagram showing the configuration of the first and second receivers and steam separation drum after startup, according to one or more embodiments of the disclosed subject matter.

In FIG. 13, a final configuration of the solar thermal electricity steam generating system of FIG. 8 (i.e., during 720 of FIG. 7A) is shown. In contrast to FIG. 12, insolation 106b on the first solar receiver 304 and insolation 106a on the second solar receiver 304 results in a sufficient steam temperature and pressure at outlet line 922 for use by the turbine in generating electricity. The outlet line 922 is thus connected to the inlet line 928 of the turbine in order to generate electricity.

Figure 7C:
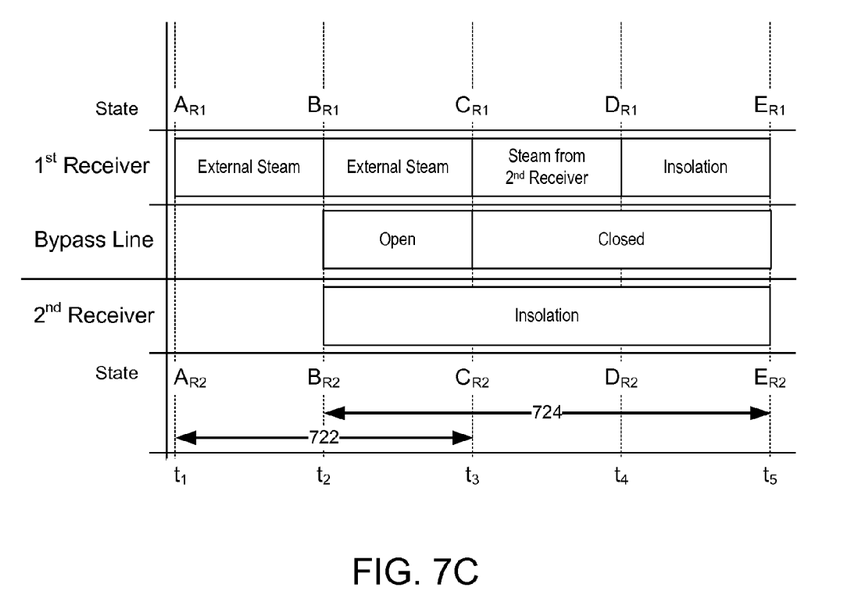
FIG. 7C is a time map showing the receiver states and heating sources for the first and second receivers as well as bypass line status during startup, according to one or more embodiments of the disclosed subject matter.

FIG. 7C is a time map showing the different periods of startup for the system of FIG. 8. In addition to the heating supplies for each receiver during the different periods and the receiver states (i.e., temperature and pressure) during the different periods, the time map also shows the status of the bypass line 902 during the different periods. Switch 904, 916, and 912 may be operated to effect the different heating and flow path conditions of FIG. 7C.

Switches 904, 916, and 924 may be part of a common flow control module, which may include a controller (not shown) and other fluid control components (also not shown). Although switches (e.g., 904, 916, and 924) are illustrated in the figures, it should be apparent that other flow control components may be employed to provide similar or the same functions. For example, one or more valves can be provided in the various fluid lines, where opening and/or closing of the valves has the effect of switching between various fluid flow paths. Thus, in another configuration, a first valve may be provided in auxiliary steam line 918 and a second valve may be provided in steam separation drum outlet line 914 in place of switch 916. During the first period of startup, the first valve may be opened while the second valve may be closed. Later, the first valve may be closed while the second valve may be opened to allow steam from the second solar receiver 302 to flow to the first solar receiver 304 by way of the steam separation drum 802.

FIG. 14 shows a variation on the system of FIG. 9. In particular, switch 924 connects outlet line 922 of the first solar receiver 304 to a turbine bypass line 926. Turbine bypass line 926 may direct fluid passing through the first solar receiver 304 to an input line 952 of condenser 956. Switch 958 may direct the output of the condenser alternatively to a drain 960 and input line 908 of the recirculation loop. Although shown in FIG. 14 in a configuration in which the output of the condenser 956 is directed to drain 960, the switch 958 may be configured to direct the output of the condenser 956 to input line 908 during any of the startup periods or during normal operation. The output line 954 of the turbine 306 may also be connected to the condenser input line 952 by way of switch 950.

FIG. 15 shows another variation on the system of FIG. 14. In particular, switch 924 connects outlet line 922 of the first solar receiver 304 to a high pressure bypass line 962. High pressure bypass line 962 may direct fluid passing through the first solar receiver 304 alternatively to a reheating solar receiver 968 or a low pressure bypass line 966 by way of switch 964. Low pressure bypass line 966 may direct fluid directly to the condenser input line 952 by way of switch 980. In some implementations, it may be advantageous to have switch 964 direct the auxiliary steam flowing through the first solar receiver 304 to the reheating solar receiver 968 so as to heat the reheating solar receiver 968 at a same time as the first solar receiver (i.e., during period 722 of FIGS. 7B-7C). After adequate heating and during periods of sufficient insolation, fluid passing to the reheater 968 may be further heated and input via switch 970 to the reheat cycle 306b of the turbine. Otherwise, the switch 970 may direct the fluid along bypass line 974 to condenser input line 952 by way of switch 980.

It should be appreciated that the steps disclosed herein can be repeated in whole or in part in order to perform a method for operating a solar thermal electricity generating system. Further, it should be appreciated that one or more of the steps disclosed herein can be performed on a single or distributed processor. Also, certain processes, modules, and units described in the various figures herein may be distributed across multiple computers or systems or may be co-located in a single processor or system.

Aspects of the disclosed solar thermal electricity generating system and operation thereof may be implemented on a general-purpose computer, a special-purpose computer, an embedded or single board computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any process capable of implementing the functions or steps described herein can be used to implement embodiments of the disclosed methods, systems, and/or devices. For example, aspects of the disclosed method and system can be implemented by a programmable control system that generates scheduling signals used by a solar thermal plant to control operating configurations to generate a startup signal commanding a startup period of operation.

Furthermore, the disclosed solar thermal electric generating system and operation thereof may be readily implemented, fully or partially, in software using, for example, object or object-oriented software development environments that provide portable source code that can be used on a variety of computer platforms. Alternatively, the disclosed solar thermal electricity generating system and operation thereof can be implemented partially or fully in hardware using, for example, standard logic circuits or a VLSI design.

Other hardware or software can be used to implement embodiments depending on the speed and/or efficiency requirements of the systems, the particular function, and/or particular software or hardware system, microprocessor, or microcomputer being utilized. The disclosed solar thermal electricity generating system and operation thereof can be implemented in hardware and/or software using any known or later developed systems or structures, devices and/or software by those of ordinary skill in the applicable art from the function description provided herein and with a general basic knowledge of the computer, machine automation, and solar thermal power generation arts.

Moreover, the disclosed solar thermal electricity generating system and operation thereof can be implemented in software executed on a programmed general purpose computer, a special purpose computer, an embedded or single board computer, a microprocessor, or the like. Also, the operation of the solar thermal electricity generating system can be implemented as a program embedded on a personal computer such as a JAVA® or CGI script, as a resource residing on a server or image processing workstation, as a routine embedded in a dedicated processing system, or the like.

Although the various components of the system are shown in the figures as connected to each other by a single line and in a specific order, it should be appreciated that this is neither required nor a limitation. Rather, various connections and arrangements are possible according to one or more contemplated embodiments. Features of the disclosed embodiments may be combined, rearranged, omitted, etc., within the scope of the present disclosure to produce additional embodiments. Furthermore, certain features may sometimes be used to advantage without a corresponding use of other features. It is, thus, apparent that there is provided, in accordance with the present disclosure, systems, methods, and devices for operating a solar thermal electricity generating system. Many alternatives, modifications, and variations are enabled by the present disclosure. While specific embodiments have been shown and described in detail to illustrate the application of the principles of the invention, it will be understood that the invention may be embodied otherwise without departing from such principles. Accordingly, Applicants intend to embrace all such alternatives, modifications, equivalents, and variations that are within the spirit and scope of the present invention.

The invention claimed is:

1. A method of operating a solar thermal system to generate electricity, comprising:
    using a programmable control system, which is configured to generate scheduling signals used by the solar thermal system to control operating configurations during a diurnal operation of the solar thermal system, to generate a first startup signal commanding a first startup period operation of the solar thermal system, the first startup signal coinciding with a first level of insolation;
    responsively to the first startup signal, controlling the solar thermal system to use a non-solar source of steam to heat a first solar receiver portion, the first solar receiver portion being connected to receive a heat transfer fluid from a second solar receiver portion upstream;
    using the programmable control system to generate a second startup signal commanding a second startup period of operation of the solar thermal system, the second startup signal coinciding with a second level of insolation that is greater than the first level of insolation;
    responsively to the second startup signal, heating the second solar receiver portion with insolation, the second solar receiver portion having a recirculation loop with a fluid separation drum configured to be bypassed responsively to the second startup signal;
    using the programmable control system to detect a first threshold temperature and pressure in the second solar receiver portion and to generate a third startup signal commanding a third startup period of operation of the solar thermal system responsively to the detected first threshold temperature and pressure;

responsively to the third startup signal, continuing to heat the second solar receiver portion with insolation while directing fluid from the second solar receiver portion to the first solar receiver portion by way of the fluid separation drum;

using the programmable control system to detect a second threshold temperature and pressure in the first solar receiver portion and to generate a fourth startup signal commanding a fourth startup period of operation of the solar thermal system responsively to the detected second threshold temperature and pressure; and responsively to the fourth startup signal, heating the first solar receiver portion with insolation while continuing to heat the second solar receiver portion with insolation and to direct fluid from the second solar receiver portion to the first solar receiver portion by way of the fluid separation drum.

2. The method of claim 1, further comprising:

using the programmable control system to detect a third threshold temperature and pressure in the first solar receiver portion and to generate a normal signal commanding a normal period of operation of the solar thermal system responsively to the detected third threshold temperature and pressure; and responsively to the normal signal, directing an output of the first solar receiver portion to a turbine so as to generate electricity.

3. A method for operating a solar thermal electricity generating system, the method comprising:

during a first time period, heating at least a portion of a first receiver using steam from an auxiliary steam source, an initiation of the first time period being responsive to a first signal from a control system;

during a second time period, heating at least a portion of a second receiver using solar insolation incident thereon, an initiation of the second time period being responsive to a second signal from the control system; and after the first time period, continuing to heat the at least a portion of the second receiver using solar insolation incident thereon while directing steam from an outlet of the second receiver to an inlet of the first receiver, wherein the first receiver is a superheating receiver and the second receiver is an evaporator, and wherein an end of the first period and initiation of the directing steam is responsive to a third signal from the control system, the third signal indicating that the steam from the second receiver is at or exceeds a threshold temperature and pressure.

4. The method of claim 3, further comprising, while directing steam to the inlet of the first receiver, further heating the steam in the first receiver using solar insolation incident thereon.

5. The method of claim 4, further comprising:

directing the further heated steam from the first receiver to a turbine; and generating electricity using said turbine.

6. The method of claim 3, wherein the first receiver is arranged downstream in the solar thermal electricity generating system with respect to the second receiver.

7. The method of claim 3, further comprising generating steam using the auxiliary steam source, wherein the steam is generated using fossil fuels, biogas, biomass, electricity, nuclear reactions, chemical steam production, stored thermal energy, waste heat from a combustion turbine, or geothermal sources.

8. The method of claim 3, wherein the first time period begins before and overlaps with the second time period.

9. The method of claim 3, wherein the first time period begins before sunrise, and the second time period begins at sunrise.

10. The method of claim 3, wherein the first time period begins before a period of reduced insolation ends, and the second time period begins when the period of reduced insolation ends.

11. The method of claim 3, wherein the first and second receivers arc arranged in a same tower within a solar field of heliostats.

12. The method of claim 3, wherein said heating at least a portion of a second receiver using solar insolation includes controlling one or more heliostats to reflect solar insolation onto a surface of the second receiver.

13. The method of claim 4, wherein said further heating the steam in the first receiver using solar insolation includes controlling one or more heliostats to reflect solar insolation onto a surface of the first receiver.

14. The method of claim 3, wherein steam is directed from the second receiver to the first receiver by way of a steam separation drum.

15. The method of claim 14, wherein the directing steam to the first receiver occurs when a temperature and pressure at the outlet of the second receiver is the same as a temperature and pressure at an outlet of the steam separation drum.

16. A method for operating a solar thermal electricity generating system, the method comprising:

during a first time period, heating at least a portion of a first receiver using steam from an auxiliary steam source;

during a second time period, heating at least a portion of a second receiver using solar insolation incident thereon; and after the first time period, continuing to heat the at least a portion of the second receiver using solar insolation incident thereon while directing steam from an outlet of the second receiver to an inlet of the first receiver, wherein the first receiver is a superheating receiver and the second receiver is an evaporator, wherein steam is directed from the second receiver to the first receiver by way of a steam separation drum, and the method comprises, during the first time period, recirculating fluid from an outlet of the second receiver back to an inlet of the second receiver along a recirculating flow path that bypasses the steam separation drum.

17. The method of claim 14, comprising, after the first time period, recirculating fluid from an outlet of the second receiver back to an inlet of the second receiver along a recirculating flow path that includes the steam separation drum.

18. The method of claim 3, further comprising, during a time period that overlaps said first and second time periods, controlling one or more heliostats to reflect solar insolation onto a surface of the second receiver to heat the at least a portion of the second receiver while heating the at least a portion of the first receiver using steam from the auxiliary steam source.

19. The method of claim 3, wherein the threshold pressure is greater than atmospheric pressure, and the threshold temperature is a steam saturation temperature at the threshold pressure.

20. A method for operating a solar thermal electricity generating system, the method comprising:

during a first time period, heating at least a portion of a first receiver by flowing steam from an auxiliary steam source through the first receiver from an inlet to an outlet thereof, steam exiting the first receiver at the outlet bypassing a steam turbine coupled to the outlet of the first receiver;

during a second time period, heating at least a portion of a second receiver using solar insolation incident thereon; and after the first time period, continuing to heat the at least a portion of the second receiver using solar insolation incident thereon while directing steam from an outlet of the second receiver to the inlet of the first receiver, wherein the first receiver is a superheating receiver and the second receiver is an evaporator, and during a portion of the first time period that does not overlap the second time period, the second receiver is unheated.

* * * * *